United States Patent
Takase

(10) Patent No.: US 7,122,616 B2
(45) Date of Patent: Oct. 17, 2006

(54) POLYESTER COMPOSITION AND PROCESS FOR PRODUCING THE SAME

(75) Inventor: Toru Takase, Matsuyama (JP)

(73) Assignee: Teijin Fibers Limited, Osaka (JP)

( * ) Notice: Subject to any disclaimer, the term of this patent is extended or adjusted under 35 U.S.C. 154(b) by 178 days.

(21) Appl. No.: 10/492,401

(22) PCT Filed: Jun. 23, 2003

(86) PCT No.: PCT/JP03/07920

§ 371 (c)(1),
(2), (4) Date: Apr. 13, 2004

(87) PCT Pub. No.: WO2004/009702

PCT Pub. Date: Jan. 29, 2004

(65) Prior Publication Data

US 2005/0085595 A1    Apr. 21, 2005

(30) Foreign Application Priority Data

Jul. 23, 2002    (JP)    ............................. 2002-213952

(51) Int. Cl.
*C08G 63/00*    (2006.01)
(52) U.S. Cl. ........................ 528/272; 525/437; 528/271
(58) Field of Classification Search ................ 525/437; 528/271, 272
See application file for complete search history.

(56) References Cited

U.S. PATENT DOCUMENTS

2004/0054019 A1 * 3/2004 Ishihara et al. ............... 521/48

FOREIGN PATENT DOCUMENTS

| JP | 54-120728 A | 9/1979 |
|----|-------------|--------|
| JP | 59-196359 A | 11/1984 |
| JP | 59-210936 A | 11/1984 |

* cited by examiner

Primary Examiner—Terressa Boykin
(74) Attorney, Agent, or Firm—Sughrue Mion, PLLC

(57) ABSTRACT

The polyester composition giving formed articles, such as fibers or films, exhibiting improved color depth and clarity, when dyed, has characteristics comprising an intrinsic viscosity of not less than 0.60, a methyl terminal group concentration of less than 1.0 equivalent/ton, and a carboxyl group concentration of not more than 60 equivalents/ton, and contains 0.1 to 5 percent by weight of a metal-containing phosphorous compound produced by reacting a phosphate ester with an alkali metal and/or alkaline earth metal-containing compound in an amount of 0.5 to 3 parts by mole converted into the alkali metal per part by mole of said phosphate ester. Therein, the "amount converted into the alkali metal" is the double of the molar number of the alkaline earth metal, when the alkaline earth metal is used, or the sum of the double of the mole number of the alkaline earth metal and the mole number of the alkali metal, when the alkali metal and the alkaline earth metal are simultaneously used.

13 Claims, No Drawings

POLYESTER COMPOSITION AND PROCESS FOR PRODUCING THE SAME

TECHNICAL FIELD

The present invention relates to a polyester composition. In more detail, the present invention relates to a polyester composition which can easily form micropores on the surface of a formed article, when formed into the shape of fiber or film, and can exhibit improved color depth and clarity, when the formed article is dyed.

BACKGROUND ART

Polyesters have widely been used as synthetic fibers, because of having many excellent characteristics. However, the polyester fibers have defects comprising inferior color development and inferior clarity, because of not having depth in color on coloration in comparison with natural fibers such as wool or silk, cellulose fibers such as rayon or acetate fibers, acrylic fibers, and the like.

In order to solve the defects, the improvements of dyes and the chemical modifications of polyesters have been tried, but a sufficient effect has not been obtained by any of the improvements and the chemical modifications.

On the other hand, as a try for imparting unevenness to the surfaces of polyester fibers to give depth to a color on coloration has been proposed, for example, a method for treating (alkali weight reduction) the fibers comprising a polyester containing polyoxyethylene glycol and/or a sulfonic acid compound with an aqueous solution of a basic compound to form wrinkle-like micropores arranged in the axial directions of the fibers.

However, a color depth-improving effect has not been recognized on the fibers obtained by this method, and the lowering in a visual concentration has contrarily been recognized.

Namely, when the alkali weight reduction is insufficient in this method, the color depth-improving effect is never recognized, because the unevenness is formed only in the surface-near places of the fibers. On the other hand, when the alkali weight reduction is sufficient, the color depth is not improved, and a visual concentration is also lowered, because light is perhaps irregularly reflected. Even when the fibers are colored in a deep color, the fibers appear whitish. In addition, the strengths of the obtained fibers are remarkably lowered, and the fibers are easily fibrillated, whereby the fibers can not resist to their employments.

Further, proposed has been a method [JP-A 54-120728 (hereinafter, JP-A means "Japanese Unexamined Patent Publication")] for subjecting a fiber comprising a polyester containing inorganic microparticles such as silica having particle diameters of not more than 80 nm to an alkali weight reduction treatment to form irregular concaves and convexes having sizes of 0.2 to 0.7 µm and further form microconcaves and microconvexes having sizes of 0.05 to 0.2 µm in the concaves and the convexes, thus improving the depth of color. However, a color depth-improving effect is also insufficient by the method, and the fiber has additionally a defect that the fiber is easily fibrillated, because of being made in such the extremely complicated uneven form.

In order to solve such the defects, proposed has been a method for producing synthetic fibers having micropores, characterized by adding (a) a metal-containing phosphorous compound represented by the below-described formula (1) (wherein, $R_1$ and $R_2$ are each a monovalent organic group, and $R_1$ and $R_2$ may be identical or different each other; m is 1, when M is an alkali metal, or ½, when M is an alkaline earth metal) and (b) an alkaline earth metal in an amount of 0.5 to 1.2 moles per mole of said metal-containing phosphorous compound without preliminarily reacting the compound (a) with the alkaline earth metal (b), at a step before a polyester synthesis reaction is finished, finishing the polyester synthesis reaction, melt-spinning the obtained polyester, and then treating the obtained fibers with an aqueous solution of a basic compound to reduce a weight of not less than 2 percent by weight. By the method, the polyester fiber having practically excellent color depth can be obtained.

(1)

According to the method, insoluble particles can surely be produced in the polyester in a homogeneously ultra fine particle-dispersed state during the reaction. However, the method has a problem that coarse particles are liable to be produced by the slight difference of addition conditions such as a temperature on the addition of the additive and a speed on the addition of the additive. Namely, since the once produced coarse particles do not disappear, the coarse particles cause the clogging of a filter in a polymerization process, and the pressure rise of a pack and the breakage of fibers in a spinning process. Thereby, the method has a problem that it is extremely difficult to perform a continuous production by a batch type production method.

Furthermore, since the alkali metal or the alkaline earth metal is added to the reaction system in this method, the metals accelerate the hydrolysis of the polyester component. Consequently, the carboxyl terminal concentration of the polyester is enhanced, and the thermal stability of the resin composition is insufficient. Additionally, a vicious circle that the carboxyl terminal groups further promote the coagulation of the microparticles is caused.

In recent years, a direct esterification production method using a dicarboxylic acid instead of the so-called organic carboxylate as an acid component has mainly been adopted, from reasons such as cost down, the decrease of impurities, and the improvement of the hue of the polyester.

However, since carboxyl terminal groups do substantially not disappear from a raw material-charging time to a polycondensation reaction-starting time in this method, the employment of an alkali metal compound or an alkaline earth metal compound as a raw material for forming a metal-containing phosphorous compound causes the formation and precipitation of a metal carboxylate, a reaction failure, and the production of scaly coarse foreign matters in large amounts. Therefore, formation processes such as a spinning process can substantially not be carried out, and the fact is that such the composition is produced only from the so-called organic carboxylate as a raw material, thereby, enhancing the production cost.

DISCLOSURE OF INVENTION

An object of the present invention is to provide a polyester composition which solves the above-described problems and gives formed products, such as fibers or films, exhibiting improved color depth and clarity, when dyed, and to provide a method for producing the polyester composition.

The polyester composition of the present invention capable of achieving the above-described object and containing a metal-containing phosphorous compound produced by reacting a phosphate ester with an alkali metal and/or alkaline earth metal-containing compound in an amount of 0.5 to 3 parts by mole converted into the alkali metal per part by mole of said phosphate ester, is characterized in that said polyester has an intrinsic viscosity of not less than 0.60, a methyl terminal group concentration of less than 1.0 equivalent/ton and a carboxyl terminal group concentration of not more than 60 equivalents/ton, and said metal-containing phosphorous compound has an average particle diameter of 0.01 to 0.1 μm and is contained in an amount of 0.1 to 5 percent by weight. Herein, the "amount converted into the alkali metal" means the double of the molar number of the alkaline earth metal, when the alkaline earth metal is used, or the sum of the double of the mole number of the alkaline earth metal and the mole number of the alkali metal, when the alkali metal and the alkaline earth metal are simultaneously used.

They are preferable that not less than 80 percent by mole of the repeating units of the above-described polyester are ethylene terephthalate units, that the polyester composition has a color b value of not more than 2.5, and that a filtration pressure rise measured at a 120 hour-elapsed time is less than 5 MPa/day, when said polyester composition is filtered through two orthogonally stacked filters each comprising a plain weave wire net having an inner diameter of 64 mm and a nominal aperture basic size of 0.026 mm (namely, corresponding to 500 mesh) in accordance with JIS G3556 at a filtration rate of 33.3 g/minute at a temperature of 290° C.

Further, a method for producing the polyester composition of the present invention, capable of achieving another object, is characterized by using a dicarboxylic acid for an ester-forming acid component in an amount of not less than 80 percent by mole based on the ester-forming component, when the polyester is produced from the ester-forming acid components and an ester-forming diol component, and further by adding a metal-containing phosphorous compound produced by reacting a phosphate ester with an alkali metal and/or alkaline earth metal-containing compound in an amount of 0.5 to 3 parts by mole converted into the alkali metal per part by mole of said phosphate ester so as to give a metal-containing phosphorous compound content of 0.1 to 5 percent by weight, at a step on the way of said production process.

Furthermore, they are preferable that not less than 80 percent by mole of the above-described ester-forming acid component is terephthalic acid, that the process for producing the above-described polyester comprises a process for esterifying the ester-forming acid component with the ester-forming diol component in an esterification vessel, a process for transporting a part of the produced oligomer liquid to a polycondensation reaction vessel to perform the polymerization, and a process for newly supplying the ester-forming acid component and the ester-forming diol component to the oligomer left in the esterification vessel to carry out the esterification, that within 30 minutes after the finish of the transportation of the oligomer liquid to the above-described polycondensation reaction vessel, the transported oligomer liquid is mixed with the ester-forming diol component at a temperature of not more than 50° C. in an amount of 2 to 50 parts by weight per 100 parts by weight of the transported oligomer liquid, and then further with said metal-containing phosphorous compound to carry out the polycondensation reaction, that the temperature of the oligomer after the addition of the ester-forming diol component is lowered to a temperature lower by 30 to 50° C. than the melting point of a pentamer in the oligomer liquid transported to the polycondensation reaction vessel, and that an oligomer theoretical average polymerization degree calculated from an ester-forming diol component/ ester-forming acid component ratio after the addition of the ester-forming diol component is not more than 5.

BEST MODE FOR CARRYING OUT THE INVENTION

Hereinafter, the present invention will be explained, while mainly adopting a case that the shape of a formed article is a fiber, but it is a matter of course that the same effects can also be obtained in a case that the shape of the formed article is one of other shapes, such as a filmy shape. Additionally, for example, "the diffused reflection of light on the surface of a fiber" can be read in a different way as "the diffused reflection of light on the surface of a film".

The polyester in the present invention is a linear saturated polyester synthesized from an ester-forming acid component and an ester-forming diol component. Herein, the ester-forming acid component in the present invention means a dicarboxylic acid and/or its ester-forming derivative, and the ester-forming diol component means a diol and/or its ester-forming derivative. In particular, a polyester synthesized from a dicarboxylic acid and a diol is preferable, and it is especially preferable that terephthalic acid is the main raw material of the ester-forming acid component. One or more other components may be copolymerized in response to a purpose within a range that physical properties as a general-purpose resin are not lost.

The above-described ester-forming acid component includes terephthalic acid, 2,6-naphthalenedicarboxylic acid, isophthalic acid, 1,4-cyclohexyldicarboxylic acid, adipic acid, sebacic acid, phthalic acid, phthalic anhydride, 5-sodium sulfoisophthalic acid, 5-tetrabutylphosphonium sulfoisophthalic acid, p-hydroxybenzoic acid, dimethyl terephthalate, dimethyl 2,6-naphthalenedicarboxylate, dimethyl isophthalate, 1,4-cyclohexanedicarboxylic acid, dimethyl adipate, dimethyl sebacate, dimethyl phthalate, dimethyl 5-sodium sulfoisophthalate, and dimethyl 5-tetrabutylphosphonium sulfoisophthalate.

It is especially preferable to use terephthalic acid, 2,6-naphthalenedicarboxylic acid, dimethyl terephthalate or dimethyl 2.6-naphthalenedicarboxylate. However, it is undesirable that the rate of an organic carboxylate such as dimethyl terephthalate exceeds 20 percent by mole, because the hue of the obtained polyester is deteriorated due to an aldehyde and colorable decomposition products produced by the decomposition of the aldehyde. Therefore, it is preferable that not less than 80 percent by mole of said ester-forming acid component is a dicarboxylic acid, especially terephthalic acid.

In addition, the ester-forming diol component includes ethylene glycol, 1,3-propanediol, 1,4-butanediol, diethylene glycol, propylene glycol, 2,2-dimethyl-1,3-propanediol, dipropylene glycol, 1,6-hexanediol, 1,4-hexanedimethanol, dimethylolpropionic acid, poly(ethylene oxide) glycol, and poly(tetramethylene oxide) glycol. It is especially preferable to use ethylene glycol, 1,3-propanediol, or 1,4-butanediol.

It is especially preferable that not less than 80 percent by mole of the repeating units of a polyester are ethylene terephthalate units as the combination of the ester-forming acid component with an ester-forming diol component, because excellent physical properties can be realized.

In the polyester in the present invention, a polybasic carboxylic acid such as trimellitic acid, trimesic acid, trimellitic anhydride, pyromellitic acid, or monopotassium trimellitate, and/or a polyhydric hydroxy compound such as glycerol, sodium dimethylolethylsulfonate, or potassium dimethylolpropionate may be copolymerized within a range for achieving the object of the present invention.

It is necessary that the intrinsic viscosity of the polyester in the present invention is not less than 0.60. When the intrinsic viscosity is less than 0.60, the physical properties of the obtained formed product such as a fiber are deteriorated, and the practicality of the polyester having the low intrinsic viscosity is therefore poor. It is not necessary that the upper limit of the intrinsic viscosity is especially determined, but it is preferable that the upper limit of the intrinsic viscosity is not more than 1.20, because the polyester is easily produced and also easily formed into the formed product such as a fiber.

Further, it is necessary that the polyester in the present invention has a methyl terminal group concentration of less than 1.0 equivalent/ton, preferably less than 0.1 equivalent/ton. When the methyl terminal group concentration is not less than 1.0 equivalent/ton, a colored substance originated by the decomposition of the methyl terminal groups is produced to yellow the polyester composition. Therefore, the methyl terminal group concentration of not less than 1.0 equivalent/ton is undesirable in the present invention especially targeting the deep color.

Additionally, it is necessary that the carboxyl terminal group concentration of the polyester in the present invention is not more than 60 equivalents/ton. The carboxyl terminal group concentration exceeding 60 equivalents/ton is undesirable, because the thermal decomposition of the polyester is increased on the production of formed products such as fibers and further because the carboxyl terminal groups are recombined with the metal component in a remelting process for the production of the formed product from the pellets to produce coagulated foreign matters insoluble in the polymer, thereby causing troubles such as the pressure rise of a pack.

Herein, the above-described inherent viscosity, methyl terminal group concentration, and carboxyl terminal group concentration are values related to the polyester, but are values measured, while a polyester composition is regarded as the polyester, when the polyester composition substantially comprises the polyester and a metal-containing phosphorous compound. When the polyester contains one or more other components as substantial components, for example, in an amount of not less than 1 percent by weight, the above-described values are values measured after the separation of the other components or values obtained by correcting the measurement values of the polyester composition itself.

As the hue of the polyester composition of the present invention, it is preferable that color b value is not more than 2.5. When the color b value exceeds 2.5, the deep color effect of the obtained formed product such as the fiber is liable to be poor.

It is necessary that the polyester composition of the present invention contains microparticles comprising the metal-containing phosphorous compound produced by reacting the phosphate ester with the alkali metal and/or alkaline earth metal-containing compound.

Herein, it is especially not necessary that the phosphate ester is limited, and various phosphate esters such as monoesters, diesters and trimesters can be used. Especially, trialkyl phosphates or triaryl phosphates are preferable.

The alkali metal and alkaline earth metal in the present invention are preferably Li, Na, Mg, Ca, Sr, and Ba, especially preferably Ca, Sr, and Ba. The alkali metal and/or alkaline earth metal-containing compound in the present invention may be any compound, when the compound reacts with the above-described phosphate ester to produce the metal-containing phosphate compound. Concretely, the salts of organic carboxylic acids with the alkali metal and/or alkaline earth metal are preferable. Especially, an acetate is preferable, because acetic acid produced by the reaction can easily be removed.

When the phosphate ester is reacted with the alkali metal and/or alkaline earth metal-containing compound to produce the metal-containing phosphorous compound, it is necessary that 1 part by mole of the phosphate ester is reacted with 0.5 to 3 parts by mole, preferably 1.5 to 3 parts by mole, especially preferably 2.5 to 3 parts by-mole converted into the alkali metal, of the alkali metal and/or the alkaline earth metal-containing compound. When the phosphate ester is a monoester or diester, it is preferable that the alkali metal and/or alkaline earth metal-containing compound is reacted in an amount of not less than 2 parts by mole converted into the alkali metal in the case of the former or in an amount of not less than 1 part by mole converted into the alkali metal in the case of the latter.

The smaller rate of the alkali metal and/or alkaline earth metal-containing compound than the range is often undesirable, because the phosphorous component deactivates a polyester polycondensation catalyst to inhibit the polycondensation reaction, when said metal-containing phosphorous compound is dispersed in the polyester. On the other hand, when the rate of the alkali metal and/or alkaline earth metal-containing compound is larger than the range, the depolymerization of the polymer due to the alkali metal and/or alkaline earth metal is accelerated, thereby being liable to cause problems such as the elongation of a reaction time and the coloration of the polymer.

The above-described metal-containing phosphorous compound is usually easily obtained by thermally reacting the corresponding phosphate ester with a prescribed amount of the corresponding alkali metal and/or alkaline earth metal-containing compound in a solvent. The solvent may suitably be selected from known solvents, but it is most preferable to use a glycol used as a raw material for the targeted polyester.

When the above-described metal-containing phosphorous compound is added to the polyester as the metal-containing phosphorous compound, it is estimated that the composition of, the metal-containing phosphorous compound is maintained even in the polyester composition.

The content of the metal-containing phosphorous compound is 0.1 to 5 percent by weight, preferably 0.2 to 3 percent by weight, especially preferably 0.3 to 2 percent by weight, based on the total weight of the polyester composition. When the polyester composition having a content of less than 0.1 percent by weight is formed into a formed article such as a fiber or film and then dyed, a deed color effect is scarcely obtained. On the other hand, a content exceeding 5 percent by weight is also undesirable, because coarse foreign matters are increased.

The polyester composition of the present invention may contain a metal compound catalyst, such as the compound of lithium, sodium, calcium, magnesium, manganese, zinc, antimony, germanium, or titanium, usually used on the production of polyesters, a phosphorous compound as an anti-coloring agent, inactive particles and an organic compound used for modifying the polyester, and the like, within ranges enabling the achievement of the purpose of the present invention.

Therein, it is necessary that the average particle diameter of the metal-containing phosphorous compound contained in the composition of the present invention is 0.01 to 0.1 μm, preferably 0.02 to 0.5 μm, from the viewpoint of the below-described micropore formability. The average particle diameter can be measured by a centrifugal sedimentation method in accordance with JIS Z8823-1. The average particle diameter of less than 0.01 μm is undesirable, because, when the polyester composition is formed into fibers, the diameters of pores finally formed in the fibers are too small, thereby not accompanying the diffused reflection of light on the surfaces of the fibers, and lacking the depth of a color, when dyed. On the other hand, the average particle diameter of more than 0.1 μm is also undesirable, because the diameters of pores formed in the fibers are too large, thereby lacking the depth of a color, when dyed, being liable to coagulate a part of the metal-containing phosphorous compound to form coarse particles, raising a pressure in a polymer filter, enhancing the pressure of a pack in a spinning process, and inducing the breakage of fibers. Herein, the micropores mean many micropores which are arranged on the surfaces of the fibers in the longitudinal directions of the fibers and have minor axes of about 0.1 to 2.0 μm and major axes of about 0.1 to 5.0 μm, when the polyester composition is formed into the fibers.

Since scarcely containing coagulated foreign matters, the polyester composition of the present invention has a characteristic that the polyester composition can be filtered at an extremely low pressure rise of less than 5 MPa/day for the particle-containing polyester composition, when filtered at a temperature of 290° C. at a flow rate of 33.3 g/minute through a 64 mm diameter filter obtained by orthogonally stacking two plain weave wire nets each having a nominal aperture basic size of 0.026 mm in accordance with JIS G3556. When the similar pressure rise is further evaluated at an elapsed time of 120 hours, the pressure rise can still be maintained at a pressure rise of less than 5 MPa/day. Thereby, realized can be effects that the clogging of the filter and the pressure rise of a pack on the melt forming of the polyester composition and troubles, such as fiber breakage and film breakage, on the processes are scarce. Herein, the pressure rise at an elapsed time of 120 hours means a pressure rise value between an elapsed time of 120 hours and an elapsed time of 144 hours.

Next, an example of preferable production methods for obtaining the polyester composition of the present invention will be explained in detail. Namely, the example is not a method for producing a polyester and then blending the produced polyester with a metal-containing phosphorous compound, or the like, but a method for adding the metal-containing phosphorous compound related to the present invention at a step on the way for producing the polyester. Herein, the method for producing the polyester is often simply referred to as a method for producing the polyester.

When the polyester is produced from an ester-forming acid component and an ester-forming diol component in the preferable production method, a dicarboxylic acid, especially terephthalic acid, is used as the ester-forming acid component in an amount of not less than 80 percent by mole of said ester-forming acid component, and a metal-containing phosphorous compound produced by reacting a phosphate ester with an alkali metal and/or alkaline earth metal-containing compound in an amount of 0.5 to 3 parts by mole per part by mole of said phosphate ester is added on the way of said production process to give a content of 0.1 to 5 percent by weight.

Especially, preferable is a production method comprising a process for esterifying an ester-forming acid component with an ester-forming diol component in an esterification vessel, a process for transporting a part of the produced oligomer liquid to a polycondensation reaction vessel to subject the transported oligomer to the polycondensation reaction, and a process for newly supplying the ester-forming acid component and the ester-forming diol component to the oligomer left in the esterification vessel to carry out the esterification reaction. Herein, it is preferable that the ester-forming acid component and the ester-forming diol component newly supplied to the oligomer are equimolar to the ester-forming acid component and the ester-forming diol component, respectively, contained in the oligomer liquid transported to the polycondensation reaction vessel. The esterification in the above-described esterification vessel and esterification reaction not only means the direct esterification of the dicarboxylic acid with the diol, but may also include an ester interchange reaction from the ester-forming acid component and the ester-forming diol component.

The weight ratio of the oligomer transported to the polycondensation reaction vessel to the oligomer left in the esterification vessel after the finish of the esterification reaction is preferably 1/5 to 5/1, especially preferably 1/2 to 2/1.

It is preferable in the above-described production method to supply the not more than 50° C. ester-forming diol component to the oligomer liquid transported to the polycondensation reaction vessel in an amount of 2 to 50 parts by weight per 100 parts by weight of the transported oligomer within 30 minutes after the finish of the liquid transportation, add the above-described metal-containing phosphorous compound, and then subjecting the mixture to the polycondensation reaction. When 30 minutes passes after the transportation of the liquid, the quality deterioration of the polymer and the lowering of productivity are liable to be caused by thermal deterioration and the like, because the total reaction time is prolonged.

In addition, it is desirable that the not more than 50° C. ester-forming diol component is added to the oligomer liquid transported to the polycondensation reaction vessel to lower the inner temperature of the vessel. When the temperature of the ester-forming diol component exceeds 50° C., it is difficult to lower the inner temperature of the polycondensation reaction vessel, and it is also desirable from the point of safety that the hot ester-forming diol component is not used.

Furthermore, the oligomer is once depolymerized by the addition of the ester-forming diol component of the specific temperature. It is preferable that the temperature of the oligomer after the addition of the ester-forming diol component is in a lower temperature range by 30 to 50° C. than the melting point of a pentamer in the oligomer. Herein, "the melting point of the pentamer in the oligomer" can be measured with a differential scanning calorimeter (DSC). When the temperature of the oligomer is lower than the temperature range and further when the inner temperature of the polycondensation reaction vessel is locally lowered by the addition of the ester-forming diol component, the mixture is solidified, thereby causing the damage of a stirring shaft and the like, or the reaction time is prolonged, thereby enhancing the risks of thermal deterioration and productivity lowering. On the other hand, when the temperature of the oligomer is higher than the temperature range, the coagulation of the metal-containing phosphorous compound tends to be increase on the addition of the metal-containing phosphorous compound.

The theoretical average polymerization degree of the oligomer termed in the present invention is theoretically calculated from the ratio of the ester-forming diol component to the ester-forming acid component in the reaction vessel, after the ester-forming diol component is added to the oligomer liquid transported to the polycondensation reaction vessel. The theoretical average polymerization degree of not more than 5, especially 2 to 5 is preferable, because micropore formability is most excellent, when the obtained composition is formed and then subjected to the below-described treatment. An addition at a step exceeding 5 is often undesirable, because coagulated foreign matters are liable to be produced perhaps due to the lowering of the solubility of the metal-containing phosphorous compound in the oligomer. The theoretical average polymerization degree can be lowered to not more than 5 by adjusting the average polymerization degree of the oligomer before the addition of the ester-forming diol component and the addition amount of the ester-forming diol component.

Within a range not inhibiting the object of the present invention, a small amount of the ester-forming acid component may be added, when the above-described ester-forming diol component is added.

The polyester composition of the present invention may be used for forming articles such as fibers or films as such, or used for producing the so-called master batches, diluting the metal-containing phosphorous compound concentration of the master batches with a polymer and then using the diluted product in a spinning process, in a film-forming process or in another forming process.

When said polyester composition is melt-spun into fibers, an ordinary melt-spinning method for polyester fibers can arbitrarily be adopted without needing a special spinning method. Herein, the spun fibers may be solid fibers not having hollow portions or hollow fibers having hollow portions. The cross-sectional outer shapes of the spun fibers and the shapes of the hollow portions may be circular shapes or modified shapes. Further, the above-described polyester containing the metal-containing phosphorous compound and a polyester not containing the metal-containing phosphorous compound may together be used to make sheath-core type conjugate fibers or side-by-side type conjugate fibers each having a two- or more-layered structure.

When micropores are formed on the surfaces of the obtained formed articles such as the fibers, the formed articles exhibit improved color depth and clarity, when dyed, and the abrasion durability of the formed articles is also improved. A means for forming such the micropores may be any means such as a physical means or a chemical means, but, when the formed articles are fibers, a means for brining the fibers into contact with a basic compound to reduce the weights of the fibers is preferable. The contact of the fibers with the basic compound can easily be carried out by, if necessary, subjecting the fibers to a treatment such as a drawing heating treatment or a false-twisting treatment, or further making a fabric from the fibers, and then treating the fibers or the fabric with an aqueous solution of a basic compound.

The basic compound used herein includes sodium hydroxide, potassium hydroxide, tetramethylammonium hydroxide, sodium carbonate, and potassium carbonate. In particular, sodium hydroxide and potassium hydroxide are preferable.

The concentration of the basic compound aqueous solution depends on the kind of the basic compound, treating conditions, and the like, but a range of 0.1 to 30 percent by weight is especially preferable. A range of the ordinary temperature to 100° C. is preferable as the treating temperature. The treatment is usually carried out in a range of 1 minute to 4 hours.

Additionally, a weight reduced by the treatment of the fibers with the aqueous solution of the basic compound is not less than 2 percent by weight, preferably not less than 5 percent by weight, especially preferably not less than 10 percent by weight. By the treatment of the fibers with the aqueous solution of the basic compound, many micropores arranged in the fiber axial direction can be formed on the surfaces of the fibers and in the neighbors thereof, thereby exhibiting excellent color depth, when the fibers are dyed. The upper limit of the reduced weight is especially not limited, but the excessive reduced weight is liable to cause the deterioration of physical properties and the fibrillation of the fibers. Therefore, it is often needed to consider the extent of the weight reduction. In many cases, 30 percent by weight is preferable as the upper limit.

EXAMPLES

The present invention will be explained in more detail hereafter with Examples. Herein, the measurements of characteristics in Examples were carried out by the following methods, respectively. "Parts" in Examples means parts by weight.

(Average Particle Diameter)

The average particle diameter was measured with CAPA-500 manufactured by Horiba Seisakusho Co. in accordance to JIS Z8823-1.

(Inherent Viscosity ($\eta$))

A sample was dissolved in a solvent mixture of 40 parts by weight of 1,1,2,2-tetrachloroethane with 60 parts by weight of phenol and then measured by an established method at 35° C.

(Filtration Pressure Rise of Polyester Composition)

A filtration pressure rise rate was evaluated for evaluating the pressure rise on the filtration of the polyester composition, as described below.

A polymer metering feeder was attached to the melted polymer exit side of a small single screw type extruder, and further orthogonally stacked two filters each comprising a plain weave wire net having an inner diameter of 64 mm and a nominal aperture basic size of 0.026 mm in accordance with JIS G3556 were attached to the exit side. Then, the temperature of the melted polymer was constantly controlled to 290° C., and the melted polymer was continuously filtered at a polymer flow rate of 33.3 g/minute for 24 hours. A pressure rise value on the filtration filter entrance side for 24 hours was defined as a filtration pressure rise rate 1. Further, the filtration operation was continued, and a pressure rise value from 120 hour time to 144 hour time was defined as a filtration pressure rise rate 2. The filtration pressure rise rate 2 is "filtration pressure rise" of the present invention.

(Color b Value)

The color b value was measured with a color-difference meter CR-300 manufactured by Minolta limited.

(Depth of Color)

Deep color degree (K/S) was used as a scale for showing the depth of color. The spectral reflection factor of a sample fabric was measured with RC-330 type recording spectrophotometer manufactured by Shimadzu Co., and the deep color degree was then determined from the following equation of Kubelka-Munk. The determined value shows that the larger the value is, the larger the deep color effect is.

$$K/S=(1-R)^2/2R$$

Therein, R, K and S represent a reflectance, an absorption coefficient, and a scattering coefficient, respectively.

(Abrasive Discoloration Resistance)

A test fabric was subjected to 200 surface-abrading operations under a load of 500 g, while using a Gakushin type surface abrasion machine for testing fastness to rubbing and using a georgette comprising 100% polyethylene terephthalate as a rubbing cloth. The extend of discoloration was judged with a gray scale for discoloration. When the abrasion is greatly low, the test fabric was classified as the first grade. When the abrasion is extremely high, the test fabric was classified as the third grade. Only the first grade is placed at a level to be supplied for practical uses.

Reference Example (Synthesis of Metal-containing Phosphorous Compound)

A 7.5 percent by weight ethylene glycol solution of calcium acetate produced by Wako Pure Chemical Industry Ltd. was added to a 5.0 percent by weight ethylene glycol solution of trimethyl phosphate produced by Daihachi Chemical Industry (Ltd.) at ordinary temperature with stirring at a rate of 1.5 parts by mole of the calcium acetate per part by mole of the trimethyl phosphate, and then maintained at 150° C. for 2.5 hours to obtain the metal-containing phosphorous compound solution.

Example 1

86 Parts by weight of terephthalic acid was esterified with 40 parts by weight of ethylene glycol in an esterification vessel by a conventional method to obtain the oligomer. 86 Parts by weight of terephthalic acid and 40 parts by weight of ethylene glycol were supplied to the oligomer for 65 minutes and subjected to an esterification reaction at 245° C. Then, 0.045 part by weight of antimony trioxide was added, and, 20 minutes later, the oligomer liquid in a molar amount equivalent to the molar amount of the oligomer produced from the added terephthalic acid and the added ethylene glycol was transported to a polycondensation reaction vessel. After the finish of the transportation, 10 parts by weight of 20° C. ethylene glycol was supplied to the polycondensation reaction vessel and then stirred and maintained for five minutes. When the inner temperature became 210° C., the metal-containing phosphorous compound solution obtained in Reference Example was added in an amount of 0.5 part by weight converted into the trimethyl phosphate. When the metal-containing phosphorous compound solution was added, the melting point of the oligomer was 200° C., and the main component of the oligomer was a trimer. Subsequently, the oligomer was heated up to 290° C. and polycondensed under a high vacuum of not more than 0.03 kPa to obtain the polyester having an inherent viscosity of 0.64, which was pelletized. The obtained polyester pellets had a color b value of 0.0, a methyl terminal group concentration of not more than 0.1 equivalent/ton, and a carboxyl terminal group concentration of 51 equivalents/ton. The average particle diameter of the metal-containing phosphorous compound was 0.03 μm. The content of the metal-containing phosphorous compound was 0.5 percent by weight.

The pellets were dried at 140° C. for 6 hours and then melt-spun through a spinneret having 36 perforated circular spinning nozzles each having a nozzle diameter of 0.3 mm at 290° C. for 120 hours. The obtained undrawn filaments were drawn at a draw ratio of 3.5 to obtain 83 dtex/36 fil drawn filaments.

A pressure rise in the spinning process was 0.1 MPa/day, and filament breakage rates in the spinning process and in the drawing process were not more than 1%, respectively. The values were comparable with those, when the polyester not containing the metal-containing phosphorous compound of the present invention was spun and drawn.

Herein, the spinning filament breakage rate among the filament breakage rates was obtained by recording the number of spinning filament breakages occurred during the operation of a spinning machine except filament breakages caused by artificial or mechanical factors and then calculating the spinning filament breakage rate (%) with the following equation.

Spinning filament breakage rate (%)=[the number of filament breakages/(the number of operated winders×the number of doffing operations)×100

(wherein, the number of the doffing operations is the number of undrawn filament packages each wound up to a specified amount (10 kg)).

Further, the drawing filament breakage rate was obtained by recording the number of drawing filament breakages occurred during the operation of a drawing machine except filament breakages caused by artificial or mechanical factors and then calculating the drawing filament breakage rate (%) with the following equation.

Drawing filament breakage rate (%)=[the number of filament breakages/(the number of operated spindles×the number of doffing operations)×100

(wherein, the number of the doffing operations is the number of drawn filament packages each wound up to a specified amount (2.5 kg)).

The obtained drawn filaments were subjected to a hard twist operation at an S-twist of 2,500 T/m or a Z-twist of 2,500 T/m, and then subjected to a steaming treatment at 80° C. for 30 minutes to fix the twists, thus obtaining the S-twist hard twisted yarn or the Z-twist hard twisted yarn. Said twist-fixed hard twisted yarns were woven at a warp density of 47 yarns/cm and at a weft density of 32 yarns/cm to produce the crepe georgette woven fabric in which units each comprising two S-twist hard twisted yarns and units each comprising two Z-twist hard twisted yarns were alternately arranged.

The obtained gray fabric was relaxed with a rotary washer at a boiling temperature for 20 minutes to crepe the fabric, preset by a conventional method, and then treated with a 3.5 percent by weight sodium hydroxide aqueous solution at a boiling temperature to obtain the fabric having a reduction rate of 20 percent by weight. It was confirmed with an electron microscope that many micropores arranged in the fiber axial direction and having minor axes of 0.1 to 0.5 μm and major axes of 0.5 to 0.8 μm were formed on the fiber surfaces of the reduced fabric.

The alkali-reduced fabric was dyed with 15% owf of Dianoix Black HG-FS (produced by Mitsubishi Chemical Co.) at 130° C. for 60 minutes, and then reduced and washed with an aqueous solution containing 1 g/L of sodium hydroxide and 1 g/L of hydrosulfite at 70° C. for 20 minutes to obtain the black dyed fabric. The color depth of the obtained black fabric and its abrasive discoloration resistance after 200 rubbing operations are shown in Table 1.

Otherwise, the above-described "filtration pressure rise of polyester composition" test was carried out, and a filtration pressure rise rate 1 and a filtration pressure rise rate 2 were measured. The results are shown in Table 1.

Furthermore, after the oligomer was transported to the polycondensation reaction vessel, 86 parts by weight of terephthalic acid and 40 parts by weight of ethylene glycol were supplied to the oligomer left in the esterification vessel for 65 minutes, and esterified at 245° C. A prescribed amount of antimony trioxide was added. 20 Minutes later, the oligomer in a molar amount equivalent to that of the oligomer obtained from the additionally supplied terephthalic acid and the additionally supplied ethylene glycol was transported to the polycondensation reaction vessel, and polymerized. Then, the polyester pellets were obtained similarly as described above. These operations were repeated, and the same results as described above were obtained.

Comparative Example 1

100 Parts by weight of dimethyl terephthalate and 70 parts by weight of ethylene glycol were subjected to an ester interchange reaction in the presence of 0.038 part by weight of manganese acetate-tetrahydrate as a catalyst by a conventional method, and the obtained oligomer was mixed with tribasic calcium phosphate ($Ca_3(PO_4)_2$) having an average particle diameter of 0.5 µm in an amount of 0.5 percent by weight based on the weight of the obtained polyester composition at 260° C., reacted for 15 minutes, mixed with 0.045 part by weight of antimony trioxide, further reacted for 5 minutes, heated to 290° C., and then polycondensed under a high vacuum of not more than 0.03 kPa to obtain the polyester having an inherent viscosity of 0.64. The polyester was pelletized.

The obtained pellets were treated similarly to those in Example 1. The results are shown in Table 1. Approximately elliptic micropores existed on the surface of the reduced fabric so that the major axes of the micropores are parallel to the fiber axes. However, the formation of large holes having diameters of not less than 5 µm was simultaneously recognized at a rate of 30% based on the total number of the micropores, and it was clarified that a deep color effect was poor.

Additionally, a methyl terminal group concentration was 3.0 equivalents/ton. A pressure rise in the spinning process was 1.5 MPa/day, and filament breakage rates in the spinning process and in the drawing process were 2% and 5%, respectively.

Comparative Example 2

Operations were carried out similarly to those in Example 1 except that 1 part by weight of p-methoxybenzoic acid as a spinneret foreign matter inhibitor was added at the same time as charging terephthalic acid, and further except that the metal-containing phosphorous compound solution obtained in Reference Example was added without adding ethylene glycol to the oligomer liquid transported to the polycondensation reaction vessel (the temperature of the oligomer was 240° C.). The results are shown in Table 1. Elliptic micropores existed on the fiber surface of the reduced fabric. However, the formation of large holes having diameters of not less than 5 µm was simultaneously recognized, and it was clarified that a deep color effect was poor.

Additionally, a methyl terminal group concentration was not more than 0.1 equivalent/ton, and a carboxyl terminal group concentration was 63 equivalents/ton.

Further, a pressure rise in the spinning process was 1.8 MPa/day, and filament breakage rates in the spinning process and in the drawing process were 2% and 4%, respectively.

Examples 2 and 3

Operations were carried out similarly to those in Example 1 except that the metal-containing phosphorous solution obtained in Reference Example was added in an amount of 0.5 part by weight converted into trimethyl phosphate, when a stirring and maintaining time was changed after the supply of 10 parts by weight of 20° C. ethylene glycol to a polycondensation reaction vessel to give an inner temperature of 190° C. (Example 2) or 220° C. (Example 3), respectively. The results are shown in Table 1.

TABLE 1

|   | Example 1 | Comparative Example 1 | Comparative Example 2 | Example 2 | Example 3 |
|---|---|---|---|---|---|
| Polyester composition |   |   |   |   |   |
| Microparticle average particle diameter µm | 0.03 | 0.50 | 0.07 | 0.02 | 0.07 |
| Micropartide content % | 0.5 | 0.5 | 0.5 | 0.5 | 0.5 |
| Inherent viscosity dL/g | 0.64 | 0.64 | 0.64 | 0.64 | 0.64 |
| Carboxyl terminal groups equivalents/ton | 51 | 45 | 63 | 45 | 53 |
| Methyl terminal groups equivalents/ton | not more than 0.1 | 3.0 | not more than 0.1 | not more than 0.1 | not more than 0.1 |
| Filtration pressure rise 1 MPa/day | 0.10 | 1.30 | 1.20 | 0.10 | 0.30 |
| Filtration pressure rise 2 MPa/day | 0.20 | 5.10 | 5.50 | 0.20 | 0.30 |
| Evaluation of processes for producing filaments |   |   |   |   |   |
| Pressure rise during spinning MPa/day | 0.1 | 1.5 | 1.8 | 0.1 | 0.2 |
| Spinning filament breakage rate | 1 | 2 | 2 | 1 | 1 |
| Drawing filament breakage rate | 1 | 5 | 4 | 0 | 1 |
| Evaluation of dyeing |   |   |   |   |   |
| Depth of color (K/S) | 26.0 | 24.5 | 24.4 | 26.2 | 25.8 |
| Abrasive discoloration resistance grade | 1 | 2 | 1 | 1 | 1 |

Examples 4 to 7

Operations were carried out similarly to those in Example 1 except that the metal-containing phosphorous solution was added so that the content of microparticles in the obtained composition was described in Table 2 and further except that the polycondensation reaction was carried out until giving an inherent viscosity described in Table 2. But, in Example 6 was used a metal-containing phosphorous compound solution obtained by using barium acetate instead of calcium acetate in Reference Example, as the metal-containing phosphorous compound.

TABLE 2

|  | Example 4 | Example 5 | Example 6 | Example 7 |
|---|---|---|---|---|
| Polyester composition |  |  |  |  |
| Microparticle average particle diameter μm | 0.03 | 0.03 | 0.08 | 0.03 |
| Microparticle content % | 0.5 | 0.2 | 2.0 | 0.5 |
| Inherent viscosity dL/g | 0.64 | 0.63 | 0.62 | 0.68 |
| Carboxyl terminal groups equivalents/ton | 53 | 48 | 45 | 46 |
| Methyl terminal groups equivalents/ton | not more than 0.1 | not more than 0.1 | not more than 0.1 | not more than 0.1 |
| Filtration pressure rise 1 MPa/day | 0.05 | 0.30 | 0.40 | 0.10 |
| Filtration pressure rise 2 MPa/day | 0.10 | 0.70 | 0.90 | 0.30 |
| Evaluation of processes for producing filaments |  |  |  |  |
| Pressure rise during spinning MPa/day | 0.1 | 0.5 | 0.5 | 0.1 |
| Spinning filament breakage rate | 0 | 2 | 2 | 2 |
| Drawing filament breakage rate | 0 | 2 | 3 | 0 |
| Evaluation of dyeing |  |  |  |  |
| Depth of color (K/S) | 25.6 | 26.8 | 25.3 | 26.1 |
| Abrasive discoloration resistance grade | 1 | 1 | 1 | 1 |

INDUSTRIAL APPLICABILITY

According to the present invention, characteristic micropores can easily be formed on the surface of a formed article such as a fiber or a film. Therefore, provided is a polyester composition which can exhibit improved color depth and clarity, when dyed. Moreover, the color depth and the clarity have excellent frictional resistance. Furthermore, since scarcely containing foreign matters, the composition has characteristics that the clogging of a filter, the pressure rise of a pack on blending and on the melt-forming of fibers, films, and the like, and troubles on processes, such as filament breakages and film breakages, are scarce.

What is claimed is:

1. A polyester composition comprising a polyester and a metal-containing phosphorous compound produced by reacting a phosphate ester with an alkali metal and/or alkaline earth metal-containing compound in an amount of 0.5 to 3 parts by mole converted into the alkali metal per part by mole of said phosphate ester, wherein
    said polyester has an intrinsic viscosity of not less than 0.60, a methyl terminal group concentration of less than 1.0 equivalent/ton and a carboxyl terminal group concentration of not more than 60 equivalents/ton, and
    said metal-containing phosphorous compound has an average particle diameter of 0.01 to 0.1 μm and is contained in an amount of 0.1 to 5 percent by weight.

2. The polyester composition according to claim 1, wherein not less than 80 percent by mole of the repeating units of the polyester are ethylene-terephathlate units.

3. The polyester composition according to claim 1 or claim 2, wherein the polyester composition has a color b value of not more than 2.5.

4. The polyester composition according to claim 1 or claim 2, wherein a filtration pressure rise measured at a 120 hour-elapsed time is <5 MPa/day, when said polyester composition is filtered through two orthogonally stacked filters each comprising a plain weave wire net having an inner diameter of 64 mm and a nominal aperture basic size of 0.026 mm in accordance with JIS G3556 at a filtration rate of 33.3 g/minute at a temperature of 290° C.

5. A method for producing a polyester composition, characterized by using a dicarboxylic acid for an ester-forming acid component in an amount of not less than 80 percent by mole based on the ester-forming component, when the polyester is produced from the ester-forming acid component and an ester-forming diol component, and further by adding a metal-containing phosphorous compound produced by reacting a phosphate ester with an alkali metal and/or alkaline earth metal-containing compound in an amount of 0.5 to 3 parts by mole converted into the alkali metal per part by mole of said phosphate ester so as to give a metal-containing phosphorous compound content of 0.1 to 5 percent by weight, at a step on the way of said production process.

6. The method for producing the polyester composition according to claim 5, wherein the dicarboxylic acid is terephthalic acid.

7. The method for producing the polyester composition according to claim 5, wherein the process for producing the polyester comprises a process for esterifying the ester-forming acid component with the ester-forming diol component in an esterification vessel, a process for transporting a part of the produced oligomer liquid to a polycondensation reaction vessel and polymerizing the transported part, and a process for newly supplying the ester-forming acid component and the ester-forming diol component to the oligomer left in the esterification vessel to carry out the esterification.

8. The method for producing the polyester composition according to claim 7, wherein within 30 minutes after the finish of the transportation of the oligomer liquid to the polycondensation reaction vessel, the ester-forming diol component at a temperature of not more than 50° C. is supplied in an amount of 2 to 50 parts by weight per 100 parts by weight of the transported oligomer liquid, and said metal-containing phosphorous compound is then added and the polycondensation reaction is carried out.

9. The method for producing the polyester composition according to claim 8, wherein the temperature of the oligomer after the addition of the ester-forming diol component is lowered to a temperature lower by 30 to 50° C. than the melting point of a pentamer in the oligomer liquid transported to the polycondensation reaction vessel, and said metal-containing phosphorous compound is then added.

10. The method for producing the polyester composition according to claim 8 or claim 9, wherein an oligomer theoretical average polymerization degree calculated from an ester-forming diol component/ester-forming acid component ratio in the polycondensation reaction vessel after the addition of the ester-forming diol component is not more than 5.

11. A polyester formed article obtained by forming the polyester composition according to claim 1 or claim 2 into a fibrous or filmy shape.

12. A polyester formed article obtained by bringing the polyester formed article according to claim 11 into contact with a basic compound to subject the polyester formed article to a weight reduction treatment.

13. The polyester formed product according to claim 12, wherein the polyester formed product has micropores on the surface thereof.

* * * * *